US012810535B2

(12) United States Patent
Jansen dos Reis et al.

(10) Patent No.: US 12,810,535 B2
(45) Date of Patent: Nov. 24, 2026

(54) ADJUSTING CONTENT DEPTH IN AN ELECTRONIC DEVICE

(71) Applicant: Apple Inc., Cupertino, CA (US)

(72) Inventors: Paulo R Jansen dos Reis, San Jose, CA (US); Thomas G Salter, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 13 days.

(21) Appl. No.: 18/970,341

(22) Filed: Dec. 5, 2024

(65) Prior Publication Data

US 2025/0245910 A1 Jul. 31, 2025

Related U.S. Application Data

(60) Provisional application No. 63/625,378, filed on Jan. 26, 2024.

(51) Int. Cl.
*G06F 3/01* (2006.01)
*G06T 15/20* (2011.01)

(52) U.S. Cl.
CPC .............. *G06T 15/20* (2013.01); *G06F 3/013* (2013.01)

(58) Field of Classification Search
CPC . G06T 15/20; G06T 2219/2016; G06T 19/20; G06T 19/00; G06F 3/013; G06F 3/012; G06F 3/011; G02B 2027/0185; G02B 27/0093; G02B 27/0172
See application file for complete search history.

(56) References Cited

U.S. PATENT DOCUMENTS

| | | | | |
|---|---|---|---|---|
| 9,934,614 | B2 | 4/2018 | Ramsby et al. | |
| 9,984,507 | B2 | 5/2018 | Aksoy et al. | |
| 10,198,865 | B2 | 2/2019 | Kezele et al. | |
| 10,466,780 | B1 * | 11/2019 | Ellis | G06F 3/013 |
| 11,290,706 | B2 | 3/2022 | Edwin et al. | |
| 11,503,202 | B1 * | 11/2022 | Ollila | G02B 27/017 |
| 11,568,604 | B2 | 1/2023 | Stafford et al. | |
| 2017/0161951 | A1 * | 6/2017 | Fix | G09G 5/00 |
| 2019/0311527 | A1 * | 10/2019 | Schwab | G06T 15/20 |
| 2021/0173474 | A1 * | 6/2021 | Sztuk | G06F 3/013 |
| 2025/0044919 | A1 * | 2/2025 | Edwards | G06F 3/017 |

FOREIGN PATENT DOCUMENTS

| | | | |
|---|---|---|---|
| CN | 204595327 | U | 8/2015 |
| CN | 111294586 | B | 6/2022 |
| CN | 117111736 | A | 11/2023 |
| EP | 2943836 | B1 | 4/2020 |
| JP | 2024050696 | A | 4/2024 |

* cited by examiner

*Primary Examiner* — Bryan Earles

(74) *Attorney, Agent, or Firm* — Treyz Law Group, P.C.; Joseph F. Guihan

(57) ABSTRACT

In a head-mounted device, a gaze-tracking sensor may measure a vergence angle associated with the user's eyes. The vergence angle may be used to determine the user's eye focus depth. Virtual content may be presented at a depth that is equal to the eye focus depth. When the depth of the virtual content is not equal to the eye focus depth, the virtual content may be shifted towards the eye focus depth. Once the depth of the virtual content is approximately equal to the eye focus depth, the depth of the virtual content may be locked. The depth of the virtual content may remain locked until one or more unlock criteria are met. The unlock criteria may be based on the vergence angle of the user's eyes, a head rotation, and/or a head position.

21 Claims, 13 Drawing Sheets

ADJUSTING CONTENT DEPTH IN AN ELECTRONIC DEVICE

This application claims the benefit of U.S. provisional patent application No. 63/625,378, filed Jan. 26, 2024, which is hereby incorporated by reference herein in its entirety.

BACKGROUND

This relates generally to head-mounted devices, and, more particularly, to head-mounted devices with displays.

Some electronic devices such as head-mounted devices include displays that present virtual content at a depth. If care is not taken, the depth of the virtual content may not match the depth at which a user's eyes are focused, causing the virtual content to appear blurry to the user.

It is within this context that the embodiments herein arise.

SUMMARY

An electronic device may include one or more sensors, one or more displays, one or more processors, and memory storing instructions configured to be executed by the one or more processors, the instructions for displaying, via the one or more displays, a virtual object at a first depth, determining that an eye focus depth is different than the first depth using a first subset of the one or more sensors, shifting the virtual object from the first depth towards the eye focus depth while displaying the virtual object, and locking the virtual object at the current depth in accordance with determining that a first criterion associated with a current depth of the virtual object relative to the eye focus depth is met.

An electronic device may include one or more sensors, one or more displays, one or more processors, and memory storing instructions configured to be executed by the one or more processors, the instructions for displaying, via the one or more displays, a virtual object at a first depth, determining one or more parameters including vergence angle using a first subset of the one or more sensors, continuing to display the virtual object at the first depth in accordance with determining that a first change in any one of the one or more parameters does not meet a first criterion, and shifting the virtual object from the first depth towards a current eye focus depth in accordance with determining that a second change in the vergence angle does meet the first criterion.

An electronic device may include one or more displays, one or more lenses, one or more processors, and memory storing instructions configured to be executed by the one or more processors, the instructions for displaying, via the one or more displays, a virtual object at the first depth while the one or more lenses have a focus distance at a first depth, adjusting, at a first rate, the focus distance of the one or more lenses from the first depth to a second depth that is different than the first depth, and shifting the virtual object from the first depth towards the second depth at a second rate that is based on the first rate while displaying the virtual object.

DETAILED DESCRIPTION

Figure 1:
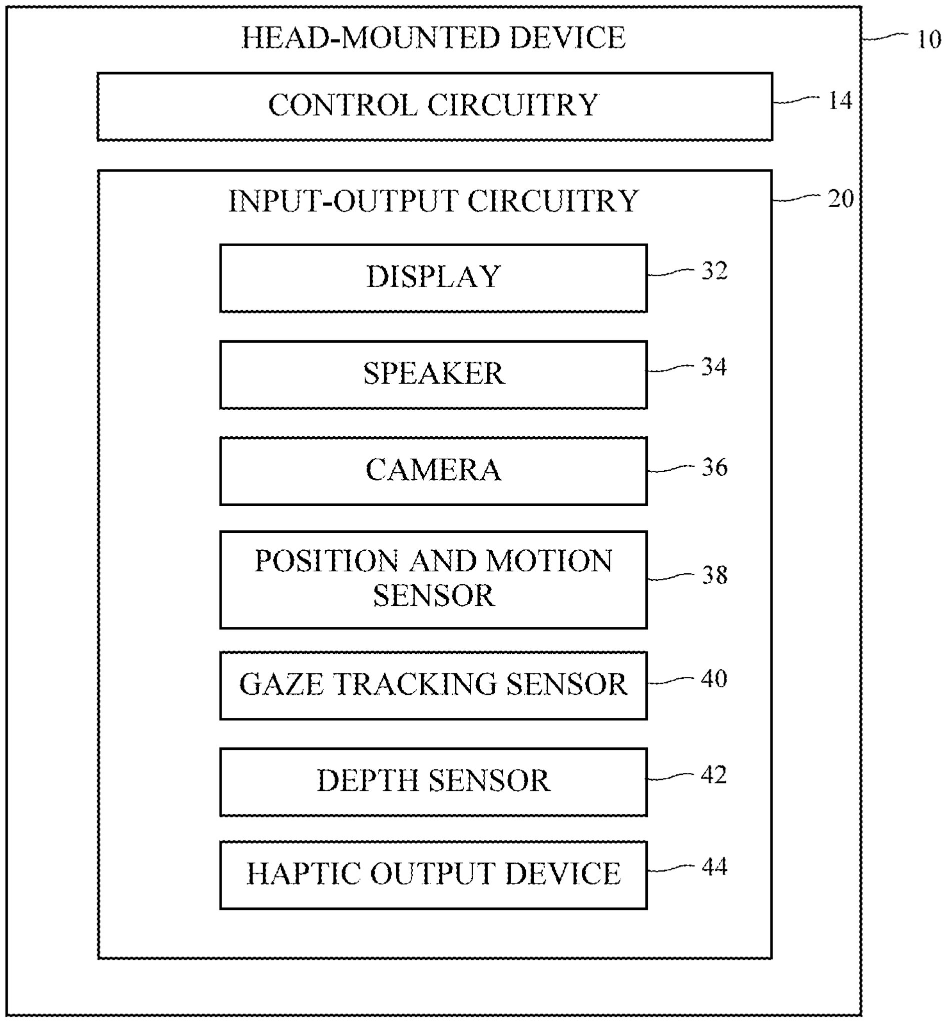
FIG. 1 is a schematic diagram of an illustrative head-mounted device in accordance with some embodiments.

Head-mounted devices may display different types of extended reality content for a user. The head-mounted device may display a virtual object that is perceived at an apparent depth within the physical environment of the user. Virtual objects may sometimes be displayed at fixed locations relative to the physical environment of the user. For example, consider an example where a user's physical environment includes a table. A virtual object may be displayed for the user such that the virtual object appears to be resting on the table. As the user moves their head and otherwise interacts with the XR environment, the virtual object remains at the same, fixed position on the table (e.g., as if the virtual object were another physical object in the XR environment). This type of content may be referred to as world-locked content (because the position of the virtual object is fixed relative to the physical environment of the user).

Other virtual objects may be displayed at locations that are defined relative to the head-mounted device or a user of the head-mounted device. First, consider the example of virtual objects that are displayed at locations that are defined relative to the head-mounted device. As the head-mounted device moves (e.g., with the rotation of the user's head), the virtual object remains in a fixed position relative to the head-mounted device. For example, the virtual object may be displayed in the front and center of the head-mounted device (e.g., in the center of the device's or user's field-of-view) at a particular distance. As the user moves their head left and right, their view of their physical environment changes accordingly. However, the virtual object may remain fixed in the center of the device's or user's field of view at the particular distance as the user moves their head (assuming gaze direction remains constant). This type of content may be referred to as head-locked content. The head-locked content is fixed in a given position relative to the head-mounted device (and therefore the user's head which is supporting the head-mounted device). The head-locked content may not be adjusted based on a user's gaze direction. In other words, if the user's head position remains constant and their gaze is directed away from the head-locked content, the head-locked content will remain in the same apparent position.

Second, consider the example of virtual objects that are displayed at locations that are defined relative to a portion of the user of the head-mounted device (e.g., relative to the user's torso). This type of content may be referred to as body-locked content. For example, a virtual object may be displayed in front and to the left of a user's body (e.g., at a location defined by a distance and an angular offset from a forward-facing direction of the user's torso), regardless of which direction the user's head is facing. If the user's body is facing a first direction, the virtual object will be displayed in front and to the left of the user's body. While facing the first direction, the virtual object may remain at the same, fixed position relative to the user's body in the XR environment despite the user rotating their head left and right (to look towards and away from the virtual object). However, the virtual object may move within the device's or user's field of view in response to the user rotating their head. If the user turns around and their body faces a second direction that is the opposite of the first direction, the virtual object will be repositioned within the XR environment such that it is still displayed in front and to the left of the user's body. While facing the second direction, the virtual object may remain at the same, fixed position relative to the user's body in the XR environment despite the user rotating their head left and right (to look towards and away from the virtual object).

In the aforementioned example, body-locked content is displayed at a fixed position/orientation relative to the user's body even as the user's body rotates. For example, the virtual object may be displayed at a fixed distance in front of the user's body. If the user is facing north, the virtual object is in front of the user's body (to the north) by the fixed distance. If the user rotates and is facing south, the virtual object is in front of the user's body (to the south) by the fixed distance.

Alternatively, the distance offset between the body-locked content and the user may be fixed relative to the user whereas the orientation of the body-locked content may remain fixed relative to the physical environment. For example, the virtual object may be displayed in front of the user's body at a fixed distance from the user as the user faces north. If the user rotates and is facing south, the virtual object remains to the north of the user's body at the fixed distance from the user's body.

Body-locked content may also be configured to always remain gravity or horizon aligned, such that head and/or body changes in the roll orientation would not cause the body-locked content to move within the XR environment. Translational movement may cause the body-locked content to be repositioned within the XR environment to maintain the fixed distance from the user. Subsequent descriptions of body-locked content may include both of the aforementioned types of body-locked content.

A schematic diagram of an illustrative head-mounted device is shown in FIG. 1. As shown in FIG. 1, head-mounted device 10 (sometimes referred to as electronic device 10, system 10, head-mounted display 10, etc.) may have control circuitry 14. Control circuitry 14 may be configured to perform operations in head-mounted device 10 using hardware (e.g., dedicated hardware or circuitry), firmware and/or software. Software code for performing operations in head-mounted device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

Head-mounted device 10 may include input-output circuitry 20. Input-output circuitry 20 may be used to allow data to be received by head-mounted device 10 from external equipment (e.g., a tethered computer, a portable device such as a handheld device or laptop computer, or other electrical equipment) and to allow a user to provide head-mounted device 10 with user input. Input-output circuitry 20 may also be used to gather information on the environment in which head-mounted device 10 is operating. Output components in circuitry 20 may allow head-mounted device 10 to provide a user with output and may be used to communicate with external electrical equipment.

As shown in FIG. 1, input-output circuitry 20 may include a display such as display 32. Display 32 may be used to display images for a user of head-mounted device 10. Display 32 may be a transparent display so that a user may observe physical objects through the display while computer-generated content is overlaid on top of the physical objects by presenting computer-generated images on the display. A transparent display may be formed from a transparent pixel array (e.g., a transparent organic light-emitting diode display panel) or may be formed by a display device that provides images to a user through a beam splitter, holographic coupler, or other optical coupler (e.g., a display device such as a liquid crystal on silicon display). Alternatively, display 32 may be an opaque display that blocks light from physical objects when a user operates head-mounted device 10. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 32 is opaque, the display may also optionally display entirely computer-generated content (e.g., without displaying images of the physical environment).

Display 32 may include one or more optical systems (e.g., lenses) that allow a viewer to view images on display(s) 16. A single display 32 may produce images for both eyes or a pair of displays 16 may be used to display images. In configurations with multiple displays (e.g., left and right eye displays), the focus distance and positions of the lenses may be selected so that any gap present between the displays will not be visible to a user (e.g., so that the images of the left and right displays overlap or merge seamlessly). Display modules that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

Input-output circuitry 20 may include various other input-output devices for gathering data and user input and for supplying a user with output. For example, input-output circuitry 20 may include one or more speakers 34 that are configured to play audio.

Input-output circuitry 20 may include one or more cameras 36. Cameras 36 may include one or more outward-facing cameras (that face the physical environment around the user when the electronic device is mounted on the user's head, as one example). Cameras 36 may capture visible light images, infrared images, or images of any other desired type. The cameras may be stereo cameras if desired. Outward-facing cameras may capture pass-through video for device 10. Cameras 22 may also include inward-facing cameras (e.g., for gaze detection).

Input-output circuitry 20 may include a gaze-tracker 40 (sometimes referred to as a gaze-tracking system or a gaze-tracking camera). The gaze-tracker 40 may be used to obtain gaze input from the user during operation of head-mounted device 10.

Gaze-tracker 40 may include a camera and/or other gaze-tracking system components (e.g., light sources that emit beams of light so that reflections of the beams from a user's eyes may be detected) to monitor the user's eyes. Gaze-tracker(s) 40 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine a vergence angle associated with the user's eyes, may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes, and/or other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 40 is merely illustrative.

As shown in FIG. 1, input-output circuitry 20 may include position and motion sensors 38 (e.g., compasses, gyroscopes, accelerometers, and/or other devices for monitoring the location, orientation, and movement of electronic device 10, satellite navigation system circuitry such as Global Positioning System circuitry for monitoring user location, etc.). Using sensors 38, for example, control circuitry 14 can monitor the current direction in which a user's head is oriented relative to the surrounding environment (e.g., a user's head pose), the current position of the user's head relative to the surrounding environment, etc. The cameras in cameras 36 may also be considered part of position and motion sensors 38. The cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique).

Input-output circuitry 20 may include one or more depth sensors 42. Each depth sensor may be a pixelated depth sensor (e.g., that is configured to measure multiple depths across the physical environment) or a point sensor (that is configured to measure a single depth in the physical environment). Camera images (e.g., from one of cameras 36) may also be used for monocular and/or stereo depth estimation. Each depth sensor (whether a pixelated depth sensor or a point sensor) may use phase detection (e.g., phase detection autofocus pixel(s)) or light detection and ranging (LIDAR) to measure depth. Any combination of depth sensors may be used to determine the depth of physical objects in the physical environment.

Input-output circuitry 20 may include a haptic output device 44. The haptic output device 44 may include actuators such as electromagnetic actuators, motors, piezoelectric actuators, electroactive polymer actuators, vibrators, linear actuators (e.g., linear resonant actuators), rotational actuators, actuators that bend bendable members, etc. The haptic output device 44 may be controlled to provide any desired pattern of vibrations.

Input-output circuitry 20 may also include other sensors and input-output components if desired (e.g., ambient light sensors, force sensors, temperature sensors, touch sensors, buttons, capacitive proximity sensors, light-based proximity sensors, other proximity sensors, strain gauges, gas sensors, pressure sensors, moisture sensors, magnetic sensors, microphones, light-emitting diodes, other light sources, wired and/or wireless communications circuitry, etc.).

A user may sometimes provide user input to head-mounted device 10 using position and motion sensors 38. In particular, position and motion sensors 38 may detect changes in head pose (sometimes referred to as head movements) during operation of head-mounted device 10.

Figure 2A:
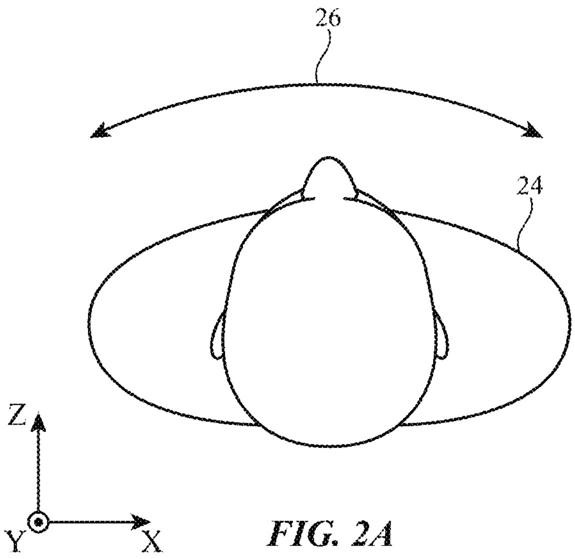
FIGS. 2A-2C are diagrams of an illustrative user of a head-mounted device showing how the user's head pose may be defined by yaw, roll, and pitch, respectively in accordance with some embodiments.
Figure 2B:
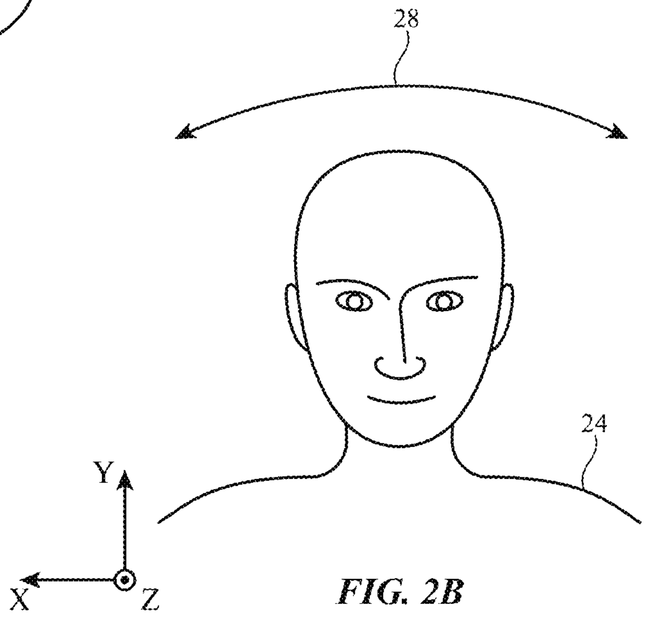
Figure 2C:
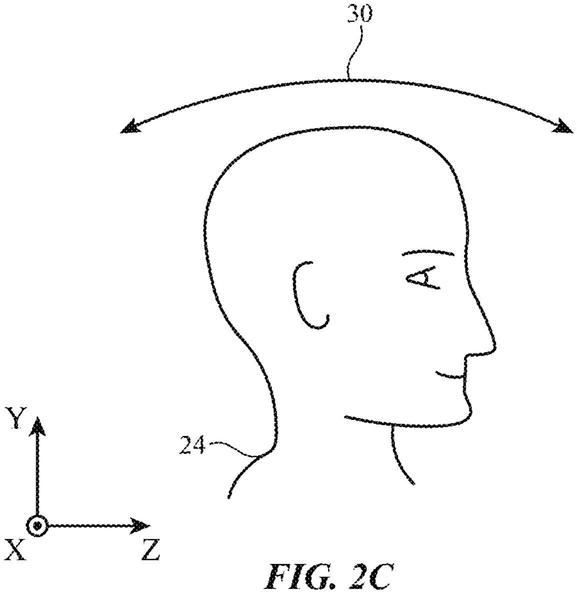

Changes in yaw, roll, and/or pitch of the user's head (and, correspondingly, the head-mounted device) may all be interpreted as user input if desired. FIGS. 2A-2C show how yaw, roll, and pitch may be defined for the user's head. FIGS. 2A-2C show a user 24. In each one of FIGS. 2A-2C, the user is facing the Z-direction and the Y-axis is aligned with the height of the user. The X-axis may be considered the side-to-side axis for the user's head, the Z-axis may be considered the front-to-back axis for the user's head, and the Y-axis may be considered the vertical axis for the user's head. The X-axis may be referred to as extending from the user's left ear to the user's right ear, as extending from the left side of the user's head to the right side of the user's head, etc. The Z-axis may be referred to as extending from the back of the user's head to the front of the user's head (e.g., to the user's face). The Y-axis may be referred to as extending from the bottom of the user's head to the top of the user's head.

As shown in FIG. 2A, yaw may be defined as the rotation around the vertical axis (e.g., the Y-axis in FIGS. 2A-2C). As the user's head rotates along direction 26, the yaw of the user's head changes. Yaw may sometimes alternatively be referred to as heading. The user's head may change yaw by rotating to the right or left around the vertical axis. A rotation to the right around the vertical axis (e.g., an increase in yaw) may be referred to as a rightward head movement. A rotation to the left around the vertical axis (e.g., a decrease in yaw) may be referred to as a leftward head movement.

As shown in FIG. 2B, roll may be defined as the rotation around the front-to-back axis (e.g., the Z-axis in FIGS. 2A-2C). As the user's head rotates along direction 28, the roll of the user's head changes. The user's head may change roll by rotating to the right or left around the front-to-back axis. A rotation to the right around the front-to-back axis (e.g., an increase in roll) may be referred to as a rightward head movement. A rotation to the left around the front-to-back axis (e.g., a decrease in roll) may be referred to as a leftward head movement.

As shown in FIG. 2C, pitch may be defined as the rotation around the side-to-side axis (e.g., the X-axis in FIGS. 2A-2C). As the user's head rotates along direction 30, the pitch of the user's head changes. The user's head may change pitch by rotating up or down around the side-to-side axis. A rotation down around the side-to-side axis (e.g., a decrease in pitch following the right arrow in direction 30 in FIG. 2C) may be referred to as a downward head movement. A rotation up around the side-to-side axis (e.g., an increase in pitch following the left arrow in direction 30 in FIG. 2C) may be referred to as an upward head movement.

It should be understood that position and motion sensors 38 may directly determine pose, movement, yaw, pitch, roll, etc. for head-mounted device 10. Position and motion sensors 38 may assume that the head-mounted device is mounted on the user's head. Therefore, herein, references to head pose, head movement, yaw of the user's head, pitch of the user's head, roll of the user's head, etc. may be considered interchangeable with references to device pose, device movement, yaw of the device, pitch of the device, roll of the device, etc.

At any given time, position and motion sensors 38 (and/or control circuitry 14) may determine the yaw, roll, and pitch of the user's head. The yaw, roll, and pitch of the user's head may collectively define the orientation of the user's head pose.

Figure 3:
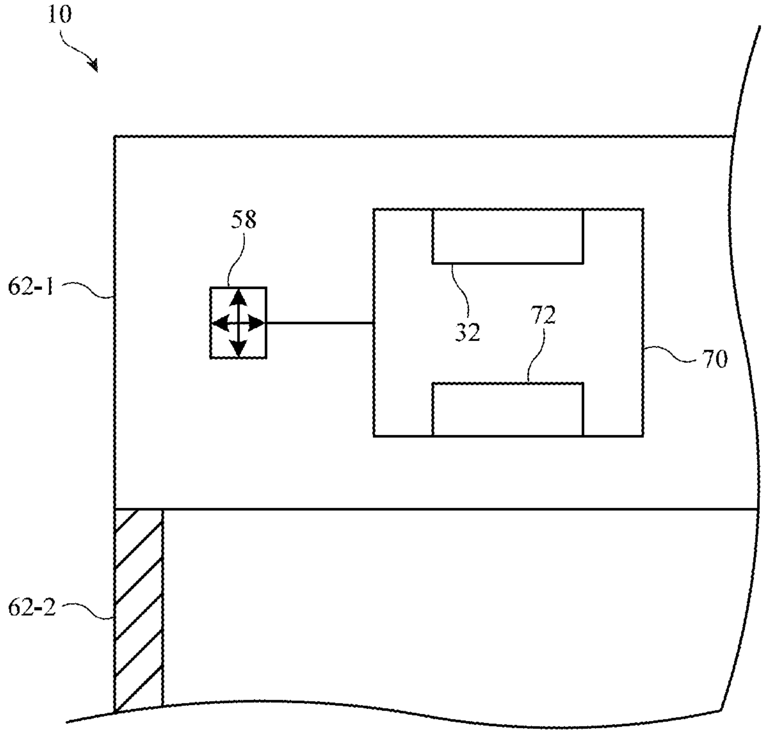
FIG. 3 is a top view of an illustrative head-mounted device with a lens module in accordance with some embodiments.

FIG. 3 is a top view of an illustrative arrangement for head-mounted device 10. As shown in FIG. 3, head-mounted device 10 may include support structures (see, e.g., support structures 62 of FIG. 1) that are used in housing the components of device 10 and mounting device 10 onto a user's head. These support structures may include, for example, structures that form housing walls and other structures for main unit 62-2 (e.g., exterior housing walls, lens module structures, etc.) and eyeglass temples or other supplemental support structures such as structures 62-1 that help to hold main unit 62-2 on a user's face.

The electronic device may include optical modules such as optical module 70. The electronic device may include left and right optical modules that correspond respectively to a user's left eye and right eye. An optical module corresponding to the user's left eye is shown in FIG. 3.

Each optical module 70 includes a corresponding lens module 72 (sometimes referred to as lens stack-up 72, lens 72, or adjustable lens 72) and display 32. Lens 72 may include one or more lens elements arranged along a common axis. Each lens element may have any desired shape and may be formed from any desired material (e.g., with any desired refractive index). The lens elements may have unique shapes and refractive indices that, in combination, focus light (e.g., from a display or from the physical environment) in a desired manner. Each lens element of lens module 72 may be formed from any desired material (e.g., glass, a polymer material such as polycarbonate or acrylic, a crystal such as sapphire, etc.).

Modules 70 may optionally be individually positioned relative to the user's eyes and relative to some of the housing wall structures of main unit 26-2 using positioning circuitry such as positioner 58. Positioner 58 may include stepper motors, piezoelectric actuators, motors, linear electromagnetic actuators, and/or other electronic components for adjusting the position of displays, the optical modules 70, and/or lens modules 72. Positioners 58 may be controlled by control circuitry 14 during operation of device 10. For example, positioners 58 may be used to adjust the spacing between modules 70 (and therefore the lens-to-lens spacing between the left and right lenses of modules 70) to match the interpupillary distance IPD of a user's eyes. In another example, the lens module may include an adjustable lens element. The curvature of the adjustable lens element may be adjusted in real time by positioner(s) 58 to compensate for a user's eyesight and/or viewing conditions.

During operation of head-mounted device 10, lens module 72 may be adjusted to change the focus distance of the lens module. Consider the example of FIGS. 4A and 4B. At a first time, shown in FIG. 4A, lens module 72 in head-mounted device 10 may have an associated focus distance $F_1$. Virtual content may be presented by display 32 at a depth $D_1$ that corresponds to focus distance $F_1$ (e.g., $D_1$ may be equal to $F_1$ or within a threshold distance of $F_1$). When focus distance $F_1$ is equal to depth $D_1$, the virtual content will be in focus to the viewer.

A subsequent change in the user's gaze, a change in an environmental condition, a change in a distance to a closest physical object, and/or other desired trigger may cause the depth of the presented virtual content to change. For example, it may be desirable to display the virtual content at depth $D_2$ in FIG. 4B. The focus distance of lens module 72 may be changed to focus distance $F_2$ that corresponds to depth $D_2$ (e.g., $D_2$ may be equal to $F_2$ or within a threshold distance of $F_2$) so that the virtual content is in focus at the new depth.

Figure 4A:
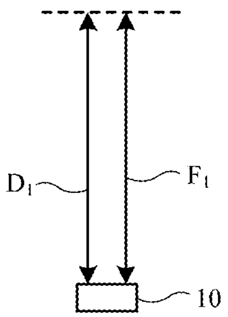
FIGS. 4A and 4B are diagrams showing how the focus distance of a lens module in a head-mounted device may change in unison with the depth of virtual content presented by the head-mounted device in accordance with some embodiments.
Figure 4B:
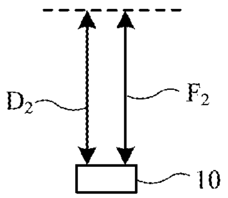

Between FIGS. 4A and 4B, both the depth of the virtual content and the focus distance of the lens module change. To maintain focus of the virtual content throughout this change, adjustments to the depth of the virtual content may be synchronized with adjustments to the focus distance of the lens module. Due to physical limitations associated with lens module 72, the focus distance of the lens module does not change instantly. Instead, the focus distance of the lens module changes gradually over time at a given rate.

Figure 5A:
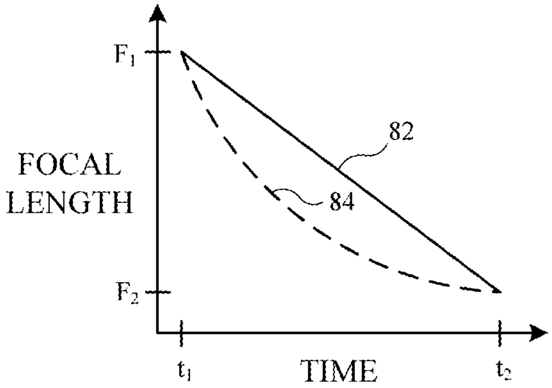
FIG. 5A is a graph showing illustrative profiles for the focus distance of a lens module as a function of time in accordance with some embodiments.

FIG. 5A shows an illustrative graph of focus distance over time for lens module 72. FIG. 5A shows two profiles: a linear profile 82 and a non-linear profile 84. Both profiles show how the focus distance may change from $F_1$ to $F_2$ over a duration of time between $t_1$ and $t_2$. The change in the focus distance may follow a linear rate (as in profile 82) or a non-linear rate (as in profile 84).

Figure 5B:
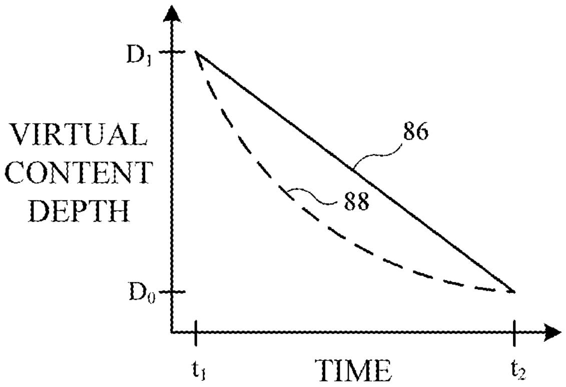
FIG. 5B is a graph showing illustrative profiles for virtual content depth as a function of time in accordance with some embodiments.

To synchronize the changes in depth of virtual content to the changes in focus distance of the lens module, the depth of the virtual content may be changed at a rate that is based on the rate of change of the focus distance. FIG. 5B shows an illustrative graph of virtual content depth over time. FIG. 5B shows two profiles: a linear profile 86 and a non-linear profile 88. Both profiles show how the depth of the virtual content may change from $D_1$ to $D_2$ over a duration of time between $t_1$ and $t_2$. The change in the virtual content depth may follow a linear rate (as in profile 86) or a non-linear rate (as in profile 88).

Control circuitry 14 may select a profile for the change in virtual content depth that matches or approximately matches the profile for the change in focus distance. Profiles for the change in focus distance may be determined using calibration of lens module 72 and stored in control circuitry 14. Instead or in addition, a profile for the change in focus distance may be estimated in real time based on current operating conditions for head-mounted device 10. Once control circuitry 14 has a predicted profile for the change in focus distance, control circuitry 14 may select a profile for the change in virtual content depth based on the profile for the change in focus distance.

Consider an example where control circuitry 14 predicts the change in focus distance will follow linear profile 82. In this case, control circuitry 14 may select linear profile 86 for the change in virtual content depth. The focus distance and virtual content depth may be updated according to linear profiles 82 and 86 respectively between $t_1$ and $t_2$. Because profiles 82 and 86 are the same, the virtual content depth may remain in focus throughout the change from $D_1$ to $D_2$.

Consider an example where control circuitry 14 predicts the change in focus distance will follow non-linear profile 84. In this case, control circuitry 14 may select non-linear profile 88 for the change in virtual content depth. The focus distance and virtual content depth may be updated according to non-linear profiles 84 and 88 respectively between $t_1$ and $t_2$. Because profiles 84 and 88 are the same, the virtual content depth may remain in focus throughout the change from $D_1$ to $D_2$.

It should be noted that the virtual content depth profile may not be identical to the focus distance profile. Control circuitry 14 may always use a linear profile for virtual content depth changes (regardless of whether the focus distance follows a linear or non-linear profile). For example, linear profile 86 may be used for the virtual content depth changes while the lens module 72 follows non-linear profile 84. This type of scheme may eliminate complications associated with determining the precise profile of the focus distance changes. Instead of determining the precise focus distance profile, control circuitry 14 may determine the total duration of the change (e.g., $t_2-t_1$) for the focus distance and change the virtual content depth at a constant (linear) rate over the total duration (between $t_1$ and $t_2$).

Figure 6A:
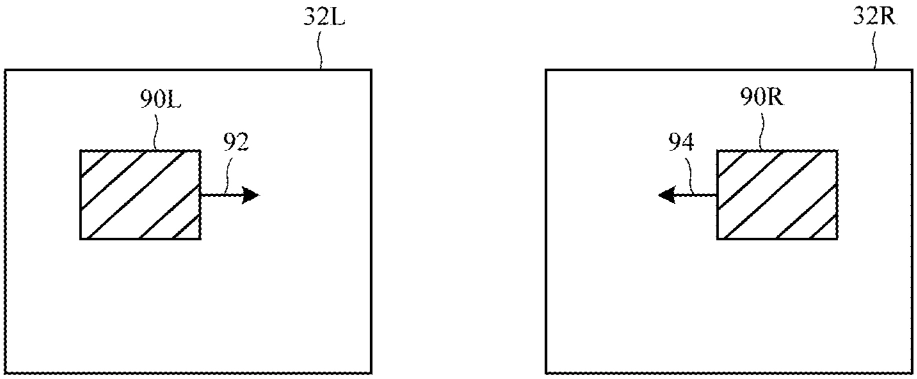
FIGS. 6A and 6B are diagrams of illustrative left and right displays showing how a virtual content depth may be updated by laterally shifting and changing the sizes of first and second images on the left and right displays in accordance with some embodiments.
Figure 6B:
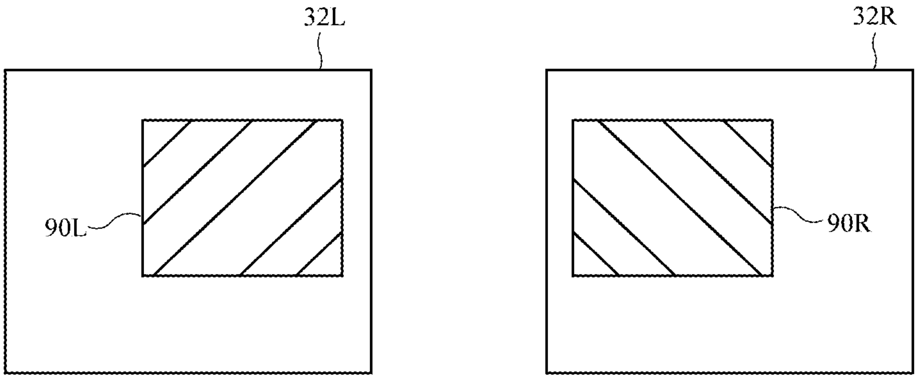

FIGS. 6A and 6B show an example of changing the virtual content depth on display(s) 32. As shown in FIG. 6A, there may be a first display 32L that presents images to a left eye of the user and a second display 32R that presents images to a right eye of the user. To present virtual object 90, a first image 90L is presented on display 32L and a second image 90R is presented on display 32R. The user's eyes will view images 90L and 90R and perceive a single virtual object 90 at a depth $D_1$.

To change the virtual content depth from $D_1$ to $D_2$, the images may be moved closer together on displays 32L/32R. As shown in FIG. 6A, image 90L is shifted laterally in direction 92 (e.g., towards display 32R) whereas image 90R is shifted laterally in direction 94 (e.g., towards display 32L). Laterally shifting the images closer together (as in FIG. 6A) will reduce the depth of the virtual content whereas laterally shifting the images further apart (e.g., the opposite directions of FIG. 6A) will increase the depth of the virtual content.

FIG. 6B shows the new locations of images 90L and 90R on displays 32L and 32R after the depth of the virtual object is changed to $D_2$. FIG. 6B also shows how the sizes of images 90L and 90R may be changed during changes in depth of the virtual object. If images 90R and 90L remain the same size on displays 32L/32R, the perceived size of virtual object 90 will decrease as the depth of the virtual object decreases and increase as the depth of the virtual object increases. To mitigate this effect, the sizes of images 90L/90R on displays 32L/32R may be increased when the depth of the virtual object decreases and decreased when the depth of the virtual object increases. FIG. 6B shows an example where the size of image 90L (when the depth is $D_2$) is larger than the size of image 90L in FIG. 6A (when the depth is $D_1$) and the size of image 90R (when the depth is $D_2$) is larger than the size of image 90R in FIG. 6A (when the depth is $D_1$).

Figure 7:
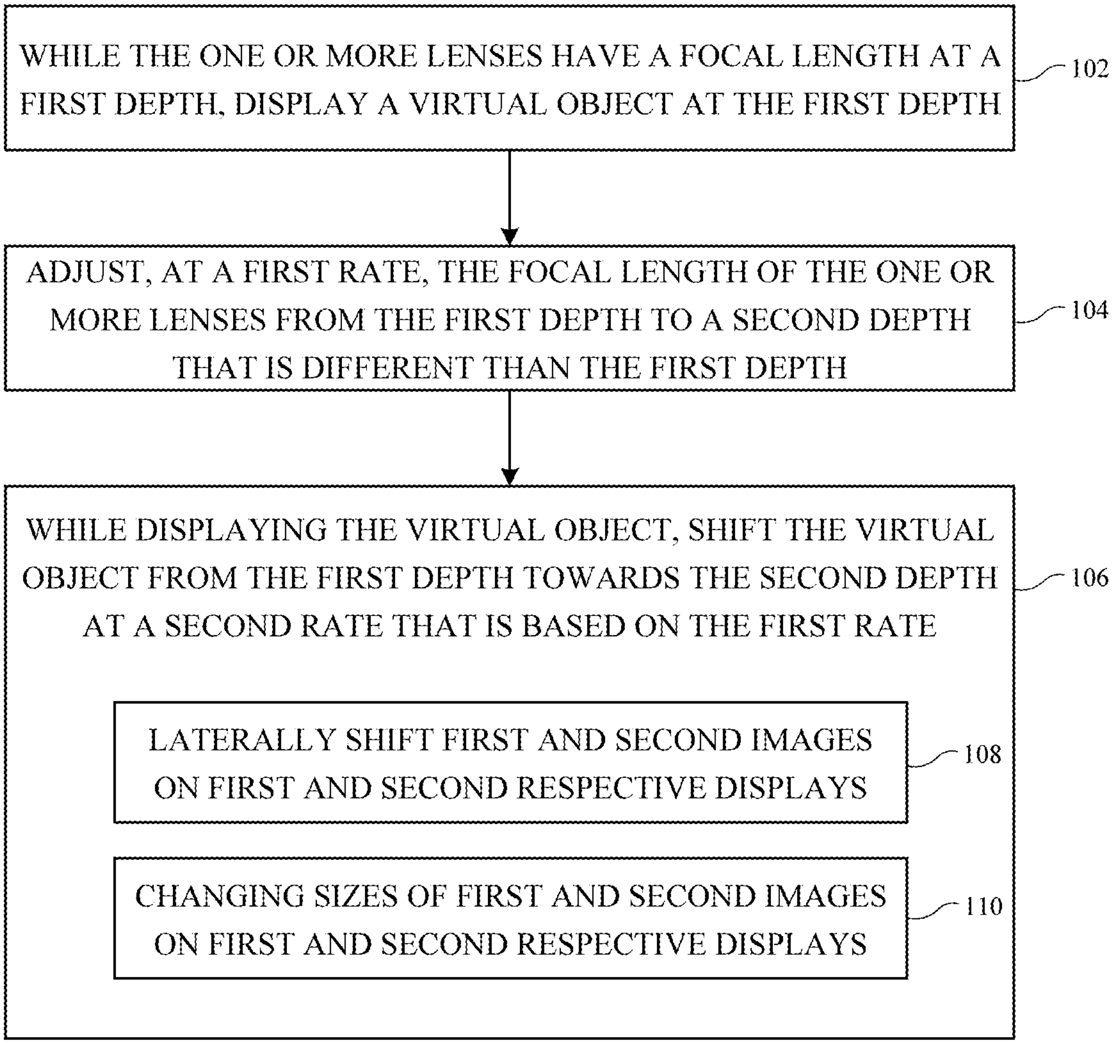
FIG. 7 is a flowchart of an illustrative method of operating a head-mounted device that updates a virtual content depth at a rate that is based on a rate of a change in focus distance in a lens module in accordance with some embodiments.

FIG. 7 is a flowchart showing an illustrative method for operating a head-mounted device. The method of FIG. 7 may be performed by control circuitry 14 of head-mounted device 10.

During the operations of block 102, control circuitry 14 may use display(s) 32 to display a virtual object at a first depth while one or more lenses (e.g., lens module 72) has a focus distance equal to the first depth.

For example, head-mounted device 10 may display a virtual object at $D_1$ while lens module 72 has a focus distance $F_1$ that is equal to $D_1$ (as shown in FIG. 4A) during the operations of block 102.

During the operations of block 104, control circuitry 14 may adjust, at a first rate, the focus distance of the one or more lenses from the first depth to a second depth that is different than the first depth. The rate of adjustment of the one or more lenses may be linear (as shown by profile 82 in FIG. 5A) or non-linear (as shown by profile 84 in FIG. 5B).

Continuing the aforementioned example, the focus distance of lens module 72 may be adjusted from $F_1$ to $F_2$ during the operations of block 104. The rate of the adjustment from $F_1$ to $F_2$ may be linear (as shown by profile 82 in FIG. 5A) or non-linear (as shown by profile 84 in FIG. 5B).

During the operations of block 106, control circuitry 14 may, while displaying the virtual object, shift the virtual object from the first depth towards the second depth at a second rate that is based on the first rate from block 104. The rate of adjustment of the depth of the virtual object may be linear (as shown by profile 86 in FIG. 5B) or non-linear (as shown by profile 88 in FIG. 5B). The second rate may be selected to be equal to the first rate, as one example. As another example, the second rate may be selected as the linear rate that causes the total duration of the change in depth to equal to the total duration of the change in focus distance.

As shown in FIG. 7, the operations of block 106 may include laterally shifting first and second images on first and second respective displays (during the operations of block 108) and/or changing sizes of first and second images on first and second respective displays (during the operations of block 110). Laterally shifting first and second images on first and second respective displays may cause the perceived depth of the images to change. Shifting the first and second images closer together may reduce the depth whereas shifting the first and second images further apart may increase the depth. Changing the sizes of the first and second images may mitigate the change in perceived size of the virtual object as the depth of the virtual object is adjusted.

Continuing the aforementioned example, during the operations of block 106 the depth of the displayed virtual object may be shifted from the first depth from block 102 ($D_1$) towards the second depth ($D_2$) that is equal to the second focus distance $F_2$ (see FIG. 4B). The depth of the virtual object may be adjusted from $D_1$ to $D_2$ between $t_1$ and $t_2$ as shown in FIG. 5B. The rate of adjustment between $D_1$ and $D_2$ may be linear (as shown by profile 86 in FIG. 5B) or non-linear (as shown by profile 88 in FIG. 5B). FIGS. 6A and 6B show how images 90L/90R of the virtual object may be shifted closer together to cause the depth of the virtual object to change from $D_1$ to $D_2$. FIG. 6B shows how images 90L/90R may have a larger size on displays 32L/32R while presented at depth $D_2$ than when presented at $D_1$ in FIG. 6A.

For certain types of content such as head-locked content, it may be desirable to present the content at a depth that matches the focus distance of the user's eyes. For example, if the user is focusing on a close depth (e.g., 30 centimeters) the head-locked content may be presented at that close depth whereas if the user is focusing on a far depth (e.g., 2 meters) the head-locked content may be presented at that far depth. Selecting the depth of head-locked content based on the focus distance of the user's eyes may be advantageous in providing a comfortable user experience. However, it may be challenging to determine the focus distance of the user's eyes in real time.

Figure 8A:
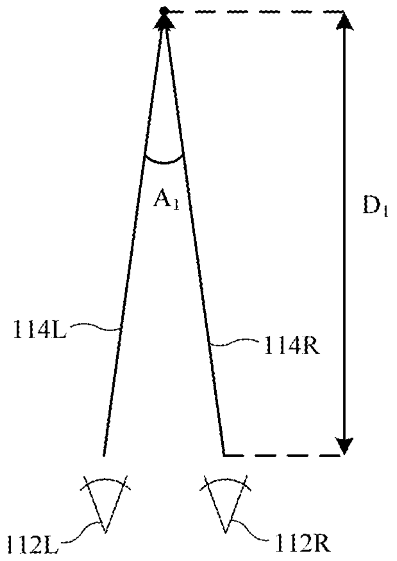
FIGS. 8A and 8B are diagrams showing how the vergence angle of a user's eyes may indicate the depth at which the eyes are focused in accordance with some embodiments.
Figure 8B:
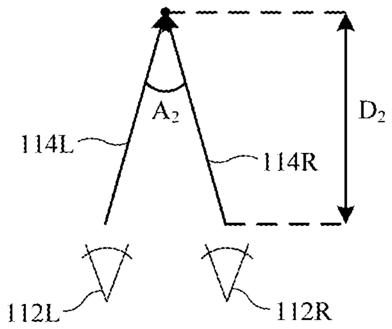

One way to determine the focus distance of the user's eyes in real time is using vergence angle. Vergence angle refers to the angle between the directions of gaze of the user's left and right eyes. FIGS. 8A and 8B show two different examples of vergence angle. As shown in FIGS. 8A and 8B, a left eye 112L has a corresponding direction of gaze 114L and a right eye 112R has a corresponding direction of gaze 114R. In FIG. 8A, the directions of gaze define a vergence angle $A_1$ that is associated with a first depth $D_1$. In FIG. 8B, the directions of gaze define a vergence angle $A_2$ that is associated with a second depth $D_2$. The focus depth of the user's eyes is inversely related to the vergence angle. In other words, smaller vergence angles have larger corresponding depths whereas larger vergence angles have smaller corresponding depths. This is demonstrated in FIGS. 8A and 8B, where $A_1<A_2$ and $D_1>D_2$.

Gaze-tracking sensor 40 may measure the vergence angle of the user's eyes in real time during operation of head-mounted device 10. The measured vergence angle may be used to calculate the depth at which the user is focusing their eyes. The calculated depth at which the user is focusing their eyes may be used to select a depth for virtual content or for other desired purposes within head-mounted device 10.

In one illustrative arrangement, the vergence angle of the user's eyes may be continuously measured and the depth of virtual content may be continuously updated to match the depth indicated by the measured vergence angle. In other words, the depth of the virtual content is continuously updated to 'chase' the depth at which the user's eyes are focused (as indicated by the vergence angle). One problem that may arise from a scheme of this type is cyclic vergence estimation errors caused by error in the vergence angle measurements by gaze-tracking sensor 40. This phenomenon is illustrated in FIG. 9.

Figure 9:
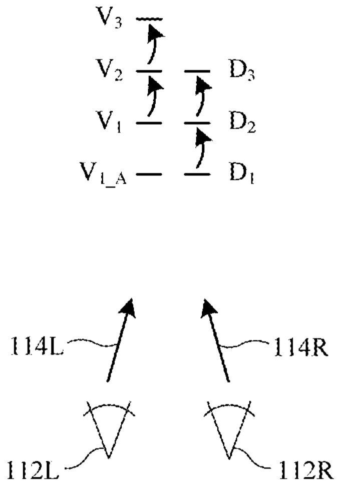
FIG. 9 is a diagram showing illustrative cyclic vergence estimation errors caused by error in vergence angle measurements by a gaze-tracking sensor in accordance with some embodiments.

FIG. 9 shows an example where at a first time ($t_1$), virtual content is presented at depth $D_1$. At the first time, the actual vergence angle of the user's eyes may be equal to $V_{1\_A}$. Vergence angle $V_{1\_A}$ has a corresponding depth that is equal to $D_1$. In other words, the user is focused on the virtual content at depth $D_1$ at $t_1$ such that the virtual content appears in-focus. Ideally, since the actual focus distance of the user's eyes matches the depth of the virtual content, the virtual content should remain at $D_1$. However, error in the measurements by gaze-tracking sensor 40 may cause a cyclic shift in the depth of the virtual content.

FIG. 9 shows an example where the measurements from gaze-tracking sensor 40 produce a measured vergence $V_1$ that is less than $V_{1\_A}$. In other words, the gaze-tracking sensor indicates that the user is focusing on a farther depth than they actually are. The vergence angle measurements at $t_1$ therefore indicate a mismatch between the focus depth of the user's eyes and the depth of the virtual content. The depth of the virtual content is updated from $D_1$ to $D_2$ to mitigate the measured mismatch and match the measured focus depth associated with vergence angle $V_1$. However, this causes the user to change the focus of their eyes to a farther depth (correlating to the increased depth of the virtual content). Accordingly, at $t_2$ when the virtual content is at depth $D_2$, the gaze-tracking sensor measures a change in vergence from $V_1$ to $V_2$ (that is less than $V_1$). The vergence angle measurements at $t_2$ indicate a mismatch between the focus depth of the user's eyes and the depth of the virtual content. The depth of the virtual content is therefore updated from $D_2$ to $D_3$ to match the measured focus depth associated with vergence angle $V_2$. However, this causes the user to change the focus of their eyes to a farther distance (correlating to the increased depth of the virtual content). Accordingly, at $t_3$ when the virtual content is at depth $D_3$, the gaze-tracking sensor measures a change in vergence from $V_2$ to $V_3$ (that is less than $V_2$). The root cause of the cyclic error is therefore that a change in the virtual content depth may prompt a change in the vergence angle of the user's eyes, which may prompt a change in the virtual content depth, which may prompt a change in the vergence angle of the user's eyes, etc.

To prevent cyclic error of this type, the depth of the virtual content may be locked once the depth of the virtual content approximately matches the vergence angle of the user's eyes. Once the depth of the virtual content is locked, the depth of the virtual content may remain fixed until an unlock criterion is met. Small changes in vergence angle may not meet the unlock criterion. The depth of the virtual content therefore remains fixed even when the vergence angle measurements indicate small changes in the vergence angle. Large changes in vergence angle may meet the unlock criterion. Once the unlock criterion is met, the depth of the virtual content is adjusted until the depth of the virtual content approximately matches the vergence angle of the user's eyes, at which point the depth of the virtual content will again be locked.

Figure 10A:
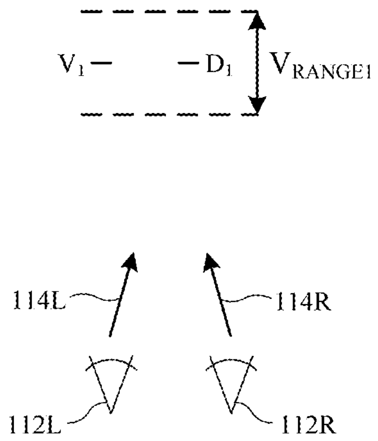
FIGS. 10A-10D are diagrams showing how the depth of virtual content may be locked to mitigate cyclic vergence estimation errors in accordance with some embodiments.

FIGS. 10A-10D show this type of locking and unlocking scheme for the depth of the virtual content. FIG. 10A shows an example where the virtual object depth ($D_1$) is approximately equal to the depth corresponding to the measured vergence angle $V_1$. Accordingly, the depth of the virtual object is locked in FIG. 10A. The depth of the virtual object therefore remains fixed at $D_1$ until an unlock criterion is met. One example of an unlock criterion (that is used in FIGS. 10A-10D) is comparing changes in the measured vergence angle to a threshold magnitude. In other words, the virtual object may remain locked at $D_1$ as long as the vergence angle stays within a threshold range $V_{RANGE1}$. As shown in FIG. 10A, the vergence angle range $V_{RANGE1}$ may be equal to the vergence angle associated with $D_1$+/−a given vergence angle magnitude.

Figure 10B:
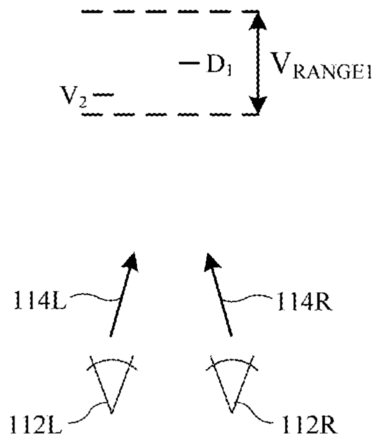

FIG. 10B shows an example where the vergence angle has changed to $V_2$ that is greater than $V_1$ (indicating that the user is focusing at a depth closer than $D_1$). However, $V_2$ is still within the vergence range $V_{RANGE1}$. Accordingly, the unlock criterion has not been met and the virtual content remains fixed at $D_1$.

Figure 10C:
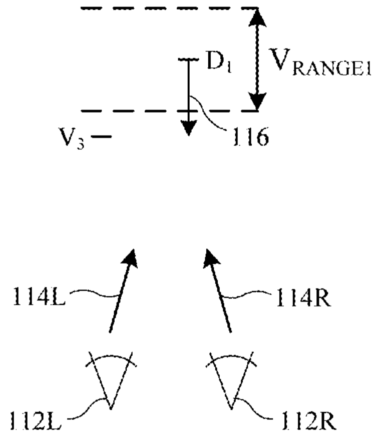

FIG. 10C shows an example where the vergence angle has changed to $V_3$ that is greater than $V_2$ (indicating that the user is focusing at a depth closer than $D_1$). $V_3$ is outside the vergence range $V_{RANGE1}$. Accordingly, the unlock criterion has been met and the virtual content is unlocked in FIG. 10C. Once the virtual content is unlocked, the virtual content may begin to shift in direction 116 towards the depth corresponding to $V_3$.

Figure 10D:
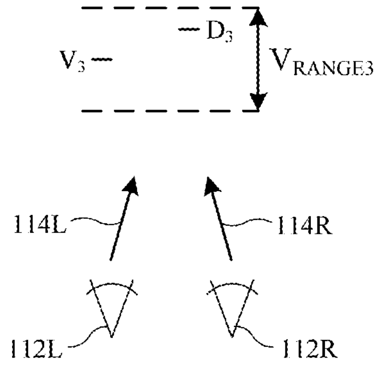

FIG. 10D shows an example where the depth of the virtual content reaches a depth $D_3$ that is close (but not equal) to a depth corresponding to the real time vergence angle $V_3$. Even though $D_3$ is not equal to the depth corresponding to the vergence angle $V_3$, the two depths may be sufficiently close that the depth of the virtual content is locked in FIG. 10D. Once the virtual content is locked, a new vergence range $V_{RANGE3}$ centered around $V_3$ is established. The new unlock criterion may involve comparing the real time vergence angle to $V_{RANGE3}$.

As a specific example mapping to FIGS. 10A-10D, consider an example where vergence angle $V_1$ is equal to 3.0 degrees and depth $D_1$ is equal to 1.00 meters. 1.00 meters may be equal to the focus depth associated with a 3.0 degree vergence angle. The threshold of change in vergence angle used to define $V_{RANGE1}$ may be equal to 0.5 degrees. Therefore $V_{RANGE1}$ in FIG. 10A is equal to between 2.5 degrees and 3.5 degrees.

In FIG. 10B, vergence angle $V_2$ is equal to 3.3 degrees. Since 3.3 degrees is within $V_{RANGE1}$ (between 2.5 degrees and 3.5 degrees), the depth of the content remains fixed at 1.00 meters ($D_1$).

In FIG. 10C, vergence angle $V_3$ is equal to 3.7 degrees. Since 3.7 degrees is outside of $V_{RANGE1}$ (between 2.5 degrees and 3.5 degrees), the virtual content is unlocked and the depth of the content is decreased. The vergence angle $V_3$ may have an associated depth of 0.85 meters. Accordingly, in FIG. 10C the depth of the content begins to shift from 1.00 meters towards 0.85 meters.

In FIG. 10D, the depth of the content may reach a depth $D_3$ that is equal to 0.9 meters. Although $D_3$ is not exactly equal to the depth 0.85 meters associated with $V_3$, the depths may be sufficiently close to lock the virtual content at $D_3$. The new $V_{RANGE3}$ in FIG. 10D is equal to $V_3$+/−0.5 degrees (e.g., between 3.2 degrees and 4.2 degrees).

FIGS. 10A-10D therefore demonstrate an example where a change in measured vergence angle is used as the unlock criterion. This example is merely illustrative. Instead or in addition, other factors such as head rotation and/or head position may be used as unlock criteria.

Figure 11A:
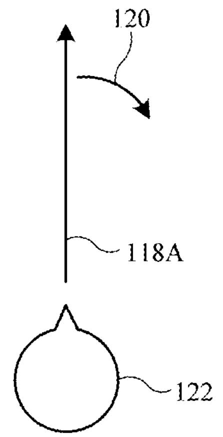
FIGS. 11A and 11B are diagrams showing how head rotation may be used to unlock a virtual content depth in accordance with some embodiments.
Figure 11B:
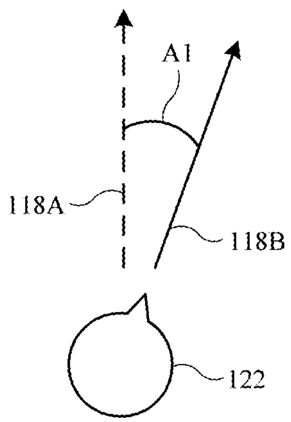

FIGS. 11A and 11B show how head rotation may be used as an unlock criterion. Head rotation may be an indicator that a user has turned to face a new physical object (that is therefore likely at a different depth than the original physical object being viewed). For example, a user may be viewing a laptop display and rotate their head to view another physical object (e.g., a clock on wall) at a different depth than the laptop display. To account for these types of scenarios, it may be desirable for head rotation to be used as an unlock criterion.

FIG. 11A shows an example where the user's head 122 faces direction 118A. The user then rotates their head in direction 120. FIG. 11B shows the user's head facing direction 118B after the rotation in direction 120. The head rotation causes the yaw of the user's head to change by an angle $A_1$ as shown in FIG. 11B.

A change in rotation over a certain threshold may qualify as an unlock criterion for virtual content. Instead or in addition, the angular acceleration of the user's head may qualify as an unlock criterion for virtual content. The threshold for change in rotation used as an unlock criterion may be equal to 3 degrees or more, 5 degrees or more, 10 degrees or more, 20 degrees or more, etc. The threshold for angular acceleration used as an unlock criterion may be equal to 5 degrees per second or more, 10 degrees per second or more, 15 degrees per second or more, 20 degrees per second or more, etc.

The head rotation unlock criterion described above may be applied to yaw, roll, and/or pitch. In other words, one or more of yaw, roll, and pitch may be individually analyzed to identify changes or accelerations that meet the unlock criterion.

Figure 12A:
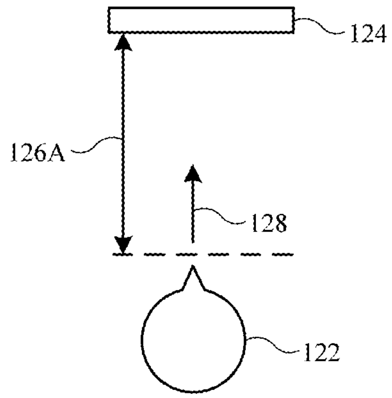
FIGS. 12A and 12B are diagrams showing how head position may be used to unlock a virtual content depth in accordance with some embodiments.
Figure 12B:
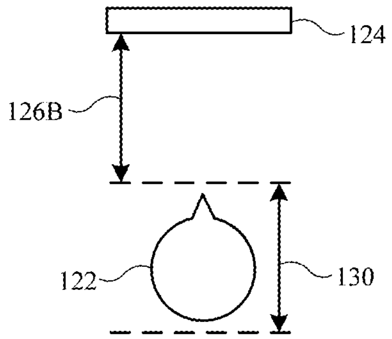

FIGS. 12A and 12B show how head position may be used as an unlock criterion. In contrast with head rotation above (which is characterized by rotation about the X, Y, and Z axes in FIGS. 2A-2C), head position may refer to the position of the head within three-dimensional space along the X, Y, and Z axes (independent of rotation). FIG. 12 shows an example where the user's head 122 is separated from physical object 124 by distance 126A. The user then moves their head in direction 128 (without any head rotation). FIG. 12B shows the user's head position after moving in direction 128. The head movement causes the position of the user's head to shift by a total displacement 130. The user's head is now separated from physical object 124 by a distance 126B that is less than distance 126A in FIG. 12A.

A change in head position over a certain threshold may qualify as an unlock criterion for virtual content. Instead or in addition, the acceleration of the user's head may qualify as an unlock criterion for virtual content. The threshold for change in head position used as an unlock criterion may be equal to 10 centimeters or more, 30 centimeters or more, 50 centimeters or more, 100 centimeters or more, etc. The threshold for acceleration used as an unlock criterion may be equal to 10 centimeters per second or more, 30 centimeters per second or more, 50 centimeters per second or more, 100 centimeters per second or more, etc. The head position unlock criterion described above may be applied to position changes in any direction (e.g., changes in position along the X-axis, changes in position along the Y-axis, changes in position along the Z-axis, changes in position along any vector between the axes, etc.).

Figure 13:
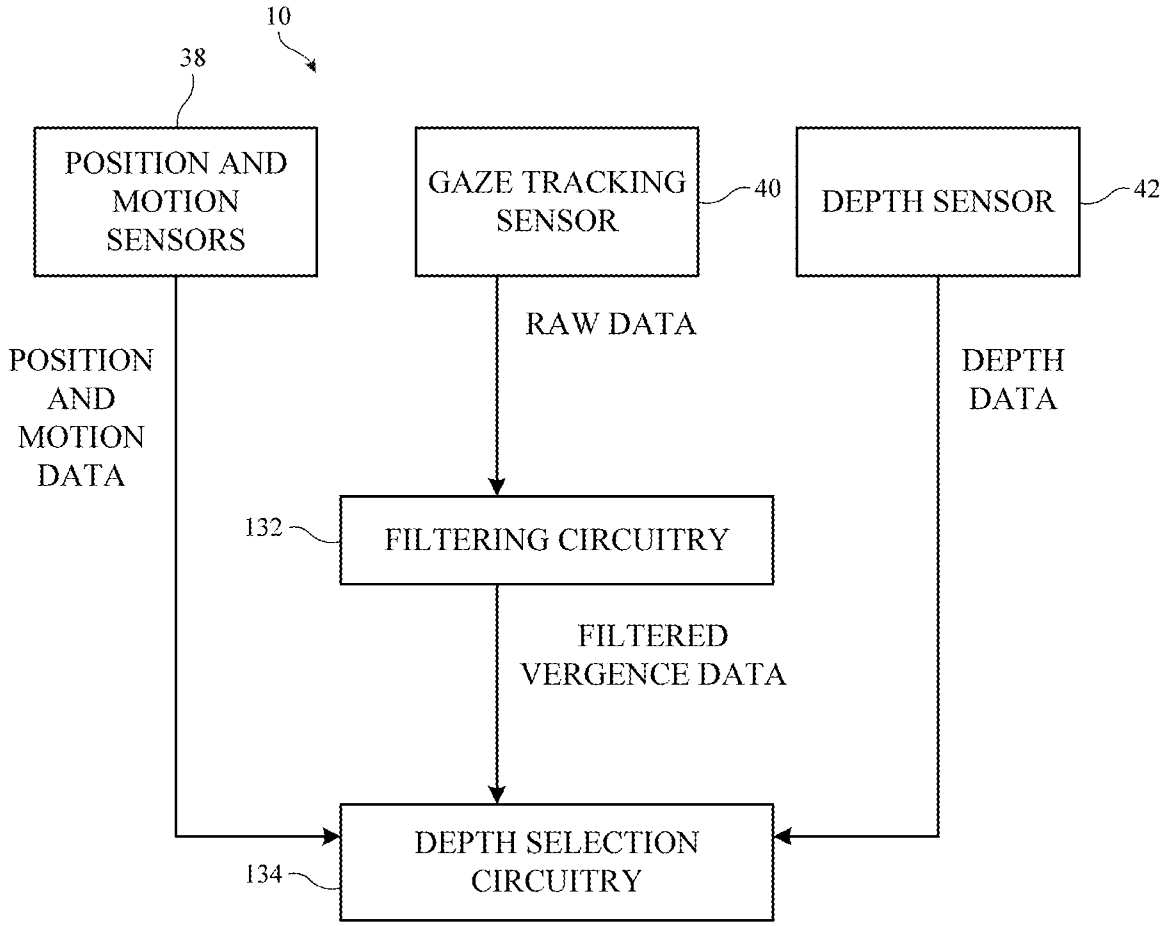
FIG. 13 is a diagram of an illustrative head-mounted device with filtering circuitry to filter data from a gaze-tracking sensor in accordance with some embodiments.

The vergence angle measurements obtained by gaze-tracking sensor 40 may be relatively noisy. To reduce noise in the vergence angle data, the vergence angle data from gaze-tracking sensor 40 may be filtered. FIG. 13 is a diagram showing how control circuitry 14 may include filtering circuitry 132 in addition to depth selection circuitry 134. Gaze-tracking sensor 40 may provide raw data to filtering circuitry 132. The gaze-tracking sensor may output data at a frequency of greater than 4 Hz, greater than 10 Hz, greater than 20 Hz, less than 30 Hz, less than 20 Hz, between 2 Hz and 20 Hz, between 3 Hz and 12 Hz, etc.

Filtering circuitry 132 may filter the raw data from gaze-tracking sensor 40 and provide the filtered data to depth selection circuitry 134. Filtering circuitry 132 may filter the data from gaze-tracking sensor 10 in a variety of ways. As one example, filtering circuitry 132 may time-average the data over a duration of time. The duration of time may have any desired magnitude (e.g., at least 0.4 seconds, at least 0.7 seconds, at least 1.0 seconds, at least 2.0 seconds, etc.). One or more outliers from the time-averaging window may also be removed before the averaging is performed. At least one maximum vergence angle measurement from the time window may be discarded and/or at least one minimum vergence angle measurement from the time window may be discarded. In a specific example, the maximum 25% of the vergence angle measurements from the time window may be discarded and the minimum 25% of the vergence angle measurement from the time window may be discarded. In other words, only the middle 50% of the vergence angle measurements from the time window are averaged.

Consider an example where gaze-tracking sensor 40 outputs raw data at 8 Hz and a time-averaging window of 1 second is used by filtering circuitry 132. Filtering circuitry 132 may receive raw data indicating that the vergence angle measurements over the previous one second are: 4.1 degrees, 3.2 degrees, 3.6 degrees, 3.0 degrees, 3.1 degrees, 4.0 degrees, 3.7 degrees, 2.9 degrees. The highest 25% of the values (e.g., 4.1 degrees and 4.0 degrees) may be discarded by filtering circuitry 132 before performing the time-averaging. The lowest 25% of the values (e.g., 2.9 degrees and 3.0 degrees) may be discarded by filtering circuitry 132 before performing the time-averaging. The remaining data (e.g., the middle 50% of the values) may be averaged to obtain a filtered vergence measurement of 3.4 degrees ((3.2+3.6+3.1+3.7)/4=3.4).

This process may be repeated after each new piece of raw data is received by filtering circuitry 132. Continuing the example above, filtering circuitry 132 may receive a new vergence angle measurement of 3.0 degrees from gaze-tracking sensor 40. The new measurement (3.0 degrees) replaces the oldest measurement (4.1 degrees) from the previous data set. The new data set of vergence angles over the previous one second is therefore: 3.2 degrees, 3.6 degrees, 3.0 degrees, 3.1 degrees, 4.0 degrees, 3.7 degrees, 2.9 degrees, 3.0 degrees. The highest 25% of the values (e.g., 4.0 degrees and 3.7 degrees) may be discarded by filtering circuitry 132 before performing the time-averaging. The lowest 25% of the values (e.g., 2.9 degrees and 3.0 degrees) may be discarded by filtering circuitry 132 before performing the time-averaging. The remaining data (e.g., the middle 50% of the values) may be averaged to obtain a filtered vergence measurement of 3.225 degrees ((3.2+3.6+3.1+3.0)/4=3.225).

Filtering circuitry 132 may therefore output filtered vergence data to depth selection circuitry 134 at the same frequency at which the raw vergence data is received. Depth selection circuitry 134 may use depth data from depth sensor 42 and position and motion data from sensors 38 in addition to the filtered vergence data to select the depth of virtual content presented on display(s) 32.

Depth selection circuitry 134 may lock the depth of virtual content when the filtered vergence data is stable (e.g., when the difference between the maximum filtered vergence measurement and the minimum filtered vergence measurement over a given duration of time is less than a threshold) and when the depth of the virtual content is close to (e.g., within a threshold of) a distance associated with the most recent filtered vergence angle measurement. The specific values for the duration of time and thresholds mentioned above may be tuned to optimize the user experience.

As specific examples, the duration of time over which the filtered vergence data is examined to assess if the vergence measurement is stable may be at least 0.1 second, at least 0.3 seconds, at least 0.5 seconds, at least 1.0 seconds, at least 2.0 seconds, etc. The threshold for the difference between the maximum filtered vergence measurement and the minimum filtered vergence measurement over the duration of time may be less than 2 degrees, less than 1.5 degrees, less than 1.0 degree, less than 0.8 degrees, less than 0.6 degrees, less than 0.4 degrees, less than 0.2 degrees, etc. The threshold for comparing the depth of the virtual content to the distance associated with the most recent filtered vergence measurement may be less than 20 centimeters, less than 10 centimeters, less than 5 centimeters, less than 3 centimeters, less than 2 centimeters, etc.

The example of assessing the 'closeness' of the depth of the virtual content and the filtered vergence angle measurement by converting the vergence angle measurement to a depth and using a threshold with the units of distance is merely illustrative. In another possible arrangement, the 'closeness' of the depth of the virtual content and the filtered vergence angle measurement may be assessed by converting the depth of the virtual content to a corresponding vergence angle and using a threshold with the units of degrees. In this case, the threshold may be less than 3 degrees, less than 2 degrees, less than 1 degree, less than 0.8 degrees, less than 0.6 degrees, less than 0.4 degrees, less than 0.2 degrees, less than 0.1 degree, etc.

Depth selection circuitry 134 may unlock the depth of the virtual content based on a change in the filtered vergence data, based on depth data from depth sensor 42, based on head position data from sensors 38, and/or based on head rotation data from sensors 38.

Possible unlock criterion include a change in filtered vergence angle (e.g., in degrees) being greater than a threshold, a rate of change in filtered vergence angle (e.g., in degrees per second) being greater than a threshold, a change in head rotation (e.g., in degrees) being greater than a threshold, a rate of change in head rotation (e.g., in degrees per second) being greater than a threshold, a change in head position (e.g., in centimeters) being greater than a threshold, and/or a rate of change in head position (e.g., in centimeters per second) being greater than a threshold.

After the depth of the virtual content is unlocked, depth selection circuitry 134 may shift the depth of the virtual content towards a depth associated with a most recent filtered vergence angle measurement until the lock criteria is met. The rate at which the depth of the virtual content is updated may be capped at a maximum value to avoid the appearance of the content 'jumping' between depths. Instead or in addition, the depth of the virtual content may be updated at a rate that is based on the rate at which the one or more lenses can be adjusted as discussed above in connection with FIGS. 3-7.

Depth data from depth sensor 42 may indicate the depth of one or more physical objects in the physical environment of the user. The depth of the physical objects may be used to determine a target depth for the virtual content.

Figure 14A:
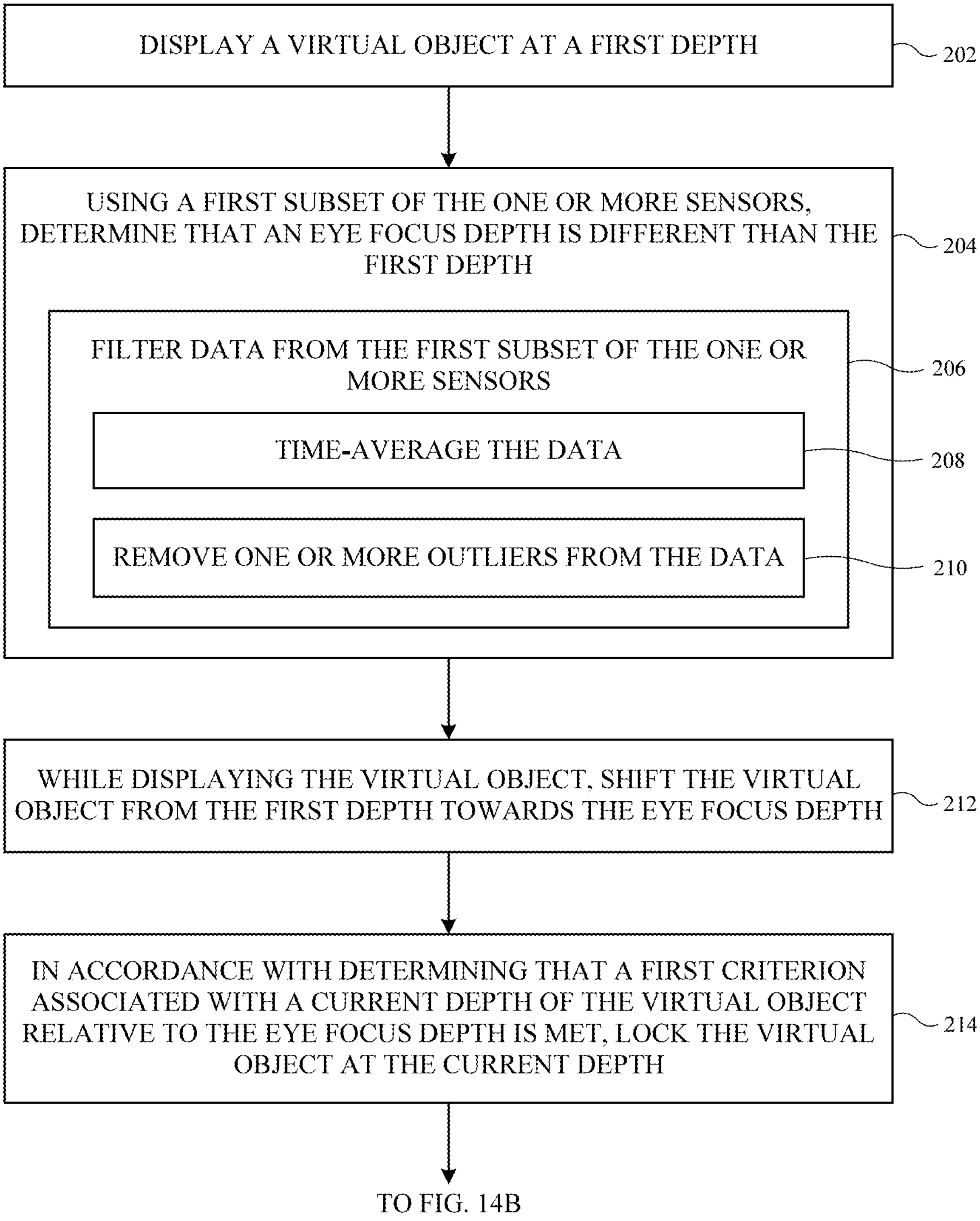
FIGS. 14A and 14B are a flowchart of an illustrative method for locking and unlocking a virtual content depth in accordance with some embodiments.
Figure 14B:
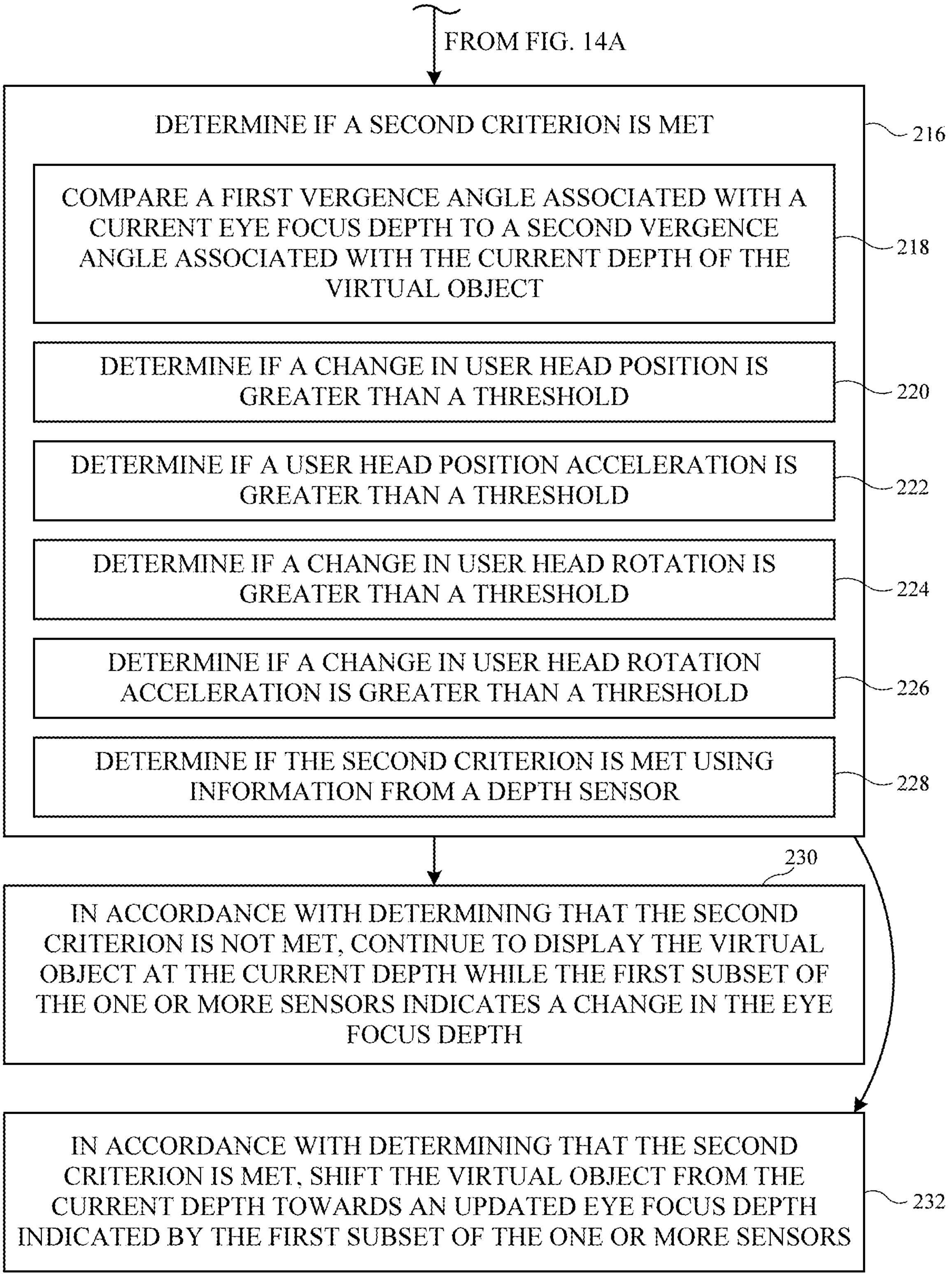

FIGS. 14A and 14B are a flowchart showing an illustrative method for operating head-mounted device 10. During the operations of block 202, control circuitry 14 may display a virtual object at a first depth on one or more displays 32. During the operations of block 204, control circuitry 14 may use a first subset of the device sensors (e.g., gaze-tracking sensor 40) to determine an eye focus depth of the user. The eye focus depth may be different than the first depth from block 202.

To determine the eye focus depth, control circuitry 14 may filter data from the gaze-tracking sensor during the operations of block 206. Filtering the data may include time-averaging the data (as shown in block 208), removing one or more outliers from the data (as shown in block 210), and/or any other desired filtering operations. As one specific example, removing one or more outliers may include removing the highest 25% of the measured vergence angles from the data set used for time-averaging and removing the lowest 25% of the measured vergence angles from the data set used for time-averaging.

During the operations of block 212, control circuitry 14 may, while displaying the virtual object, shift the virtual object from the first depth towards the eye focus depth. The control circuitry may cap the rate at which the depth of the virtual content is changed at a maximum rate. The virtual content therefore effectively chases the current eye focus depth during the operations of block 212.

During the operations of block 214, in accordance with determining that a first criterion (sometimes referred to as a lock criterion) associated with a current depth of the virtual object relative to the eye focus depth is met, the virtual object may be locked at the current depth. The criterion may be the depths being within a threshold distance (e.g., within 3 centimeters, within 10 centimeters, within 20 centimeters, within 50 centimeters, etc.) or within a threshold percentage (e.g., the current depth being within 10% of the eye focus depth, the current depth being within 5% of the eye focus depth, etc.). Instead or in addition, the first criterion may be examined in the angular domain. A vergence angle associated with the current eye focus depth may be compared to a vergence angle associated with the current depth of the virtual object. The criterion may be the vergence angles being within a threshold amount (e.g., within 0.1 degrees, within 0.3 degrees, within 0.5 degrees, within 1 degree, etc.) or within a threshold percentage (e.g., 10%, 5%, etc.).

The criterion of block 214 may also include the eye focus depth being relatively stable (e.g., the eye focus depth has stayed within a target range for a target duration of time).

After the virtual content is locked at block 214, the depth of the virtual content will no longer be shifted towards the current eye focus depth until the unlock criteria is subsequently met.

During the operations of block 216 (see FIG. 14B), control circuitry 14 may determine if a second criterion is met. The second criterion may sometimes be referred to as an unlock criterion. As one example, multiple unlock criteria may be considered based on one or more parameters such as vergence angle, head position, head rotation, etc.

The unlock criterion may include comparing a first vergence angle associated with a current eye focus depth to a second vergence angle associated with the current depth of the virtual object (as shown in block 218). If the first vergence angle differs from the second vergence angle by greater than a threshold amount (e.g., 0.1 degrees, within 0.3 degrees, within 0.5 degrees, within 1 degree, etc.), the unlock criterion may be met. If the first vergence angle differs from the second vergence angle by less than the threshold amount, the unlock criterion is not met. Instead or in addition, the unlock criterion may be examined in the distance domain (e.g., the current eye focus depth may be compared to the current depth of the virtual object).

Other possible unlock criteria include determining if a change in user head position is greater than a threshold (as shown in block 220), determining if a change in user head position acceleration is greater than a threshold (as shown in block 222), determining if a change in user head rotation is greater than a threshold (as shown in block 224), and determining if a change in user head rotation acceleration is greater than a threshold (as shown in block 226).

Head position in blocks 220 and 222 refers to the position of the user's head within three-dimensional space (regardless of the yaw, pitch, and roll of the user's head). Using head position as an unlock criterion as in blocks 220 and 220 may include using changes in head position along any direction. Head rotation in block 224 and 226 refers to changes in the yaw, pitch, and roll of the user's head. Using head rotation as an unlock criterion as in blocks 224 and 226 may include using changes in one or more of yaw, pitch, and roll.

Determining if the unlock criterion is met may also include using information from a depth sensor such as depth sensor 42. The depth sensor may measure the depth of one or more physical objects in the physical environment, which may influence when the virtual content is locked and/or unlocked and/or the selected depth of the virtual content when the virtual content is locked and/or unlocked.

It should be understood that any of the possible unlock conditions described herein may be used. When multiple criteria are considered, the virtual content depth may be unlocked whenever any single criterion is met, whenever any two criteria are met, whenever any three criteria are met, whenever all of the criteria are met, etc.

During the operations of block 230, in accordance with determining that the second criterion is not met, the control circuitry may continue to display the virtual content at the current depth (e.g., the locked depth) even when the gaze-tracking sensors indicate a change in vergence angle.

During the operations of block 232, in accordance with determining that the second criterion is met, the control circuitry may unlock the virtual content depth and shift the virtual content from the current depth towards an updated eye focus depth indicated by the gaze-tracking sensor. The virtual content depth may continuously chase the real time eye focus depth until the lock criteria is again met (e.g., as in block 214).

As an example, a virtual object may be displayed at 1.0 meter during the operations of block 202. During the operations of block 204, gaze-tracking sensor 40 may measure a filtered vergence angle associated with a depth of 0.8 meters. During the operations of block 212, the virtual object may be shifted from 1.0 meters towards the real time eye focus depth (0.8 meters). During the operations of block 214, the control circuitry may determine that the virtual object depth (e.g., 0.82 meters) is within a threshold distance of the current eye focus depth (0.8 meters) and the eye focus depth is stable. The virtual object depth is therefore locked at the current depth of 0.82 meters. During the operations of block 216, one or more unlock criteria may be analyzed. The virtual object depth may be unlocked when a current vergence angle of the user's eyes differs from a vergence angle associated with the locked content depth by more than a threshold amount (as in block 218), when the user head position changes by more than a threshold amount (as in block 220), when the user head position acceleration is greater than a threshold amount (as in block 222), when the user roll, pitch, and/or yaw changes by more than a threshold amount (as in block 224), and/or when the acceleration of roll, pitch, and/or yaw is greater than a threshold amount (as in block 226). Depth sensor information may also be used to unlock the virtual content depth if desired (as in block 228).

During the operations of block 230, when the unlock criterion is not met, the virtual object stays at the current depth (0.82 meters) even when the eye vergence changes (e.g., to a vergence angle associated with a depth of 0.78 meters). During the operations of block 232, when the unlock criterion is met, the virtual object depth is unlocked and the virtual object is shifted from the current depth (0.82 meters) towards an updated eye focus depth (e.g., 0.75 meters) associated with a real time vergence angle measurement from gaze-tracking sensor 40.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device comprising:

one or more sensors;

one or more displays;

one or more processors; and memory storing instructions configured to be executed by the one or more processors, the instructions for:

displaying, via the one or more displays, a virtual object at a first depth;

using a first subset of the one or more sensors, determining that an eye focus depth is different than the first depth;

while displaying the virtual object, shifting the virtual object from the first depth towards the eye focus depth;

in accordance with determining that a first criterion associated with a current depth of the virtual object relative to the eye focus depth is met, locking the virtual object at the current depth;

using a second subset of the one or more sensors, detecting a change in head position or head rotation; and unlocking the virtual object based on the change in head position or head rotation.

2. The electronic device defined in claim 1, wherein the instructions further comprise instructions for:

after locking the virtual object at the current depth and before unlocking the virtual object, continuing to display the virtual object at the current depth while the first subset of the one or more sensors indicates a change in the eye focus depth.

3. The electronic device defined in claim 2, wherein the instructions further comprise instructions for:

after unlocking the virtual object, shifting the virtual object from the current depth towards an updated eye focus depth indicated by the first subset of the one or more sensors.

4. The electronic device defined in claim 1, wherein displaying the virtual object at the first depth, determining that the eye focus depth is different than the first depth, shifting the virtual object from the first depth towards the eye focus depth, and locking the virtual object at the current depth comprises displaying the virtual object at the first depth, determining that the eye focus depth is different than the first depth, shifting the virtual object from the first depth towards the eye focus depth, and locking the virtual object at the current depth in accordance with a determination that the virtual object is a first type of virtual object that has a location defined relative to a location corresponding to the electronic device or a user of the electronic device.

5. The electronic device defined in claim 1, wherein the instructions further comprise instructions for:

receiving data from the first subset of the one or more sensors; and filtering the data to obtain filtered data, wherein determining that the eye focus depth is different than the first depth comprises determining that the eye focus depth is different than the first depth using the filtered data, wherein filtering the data comprises time-averaging the data, and wherein filtering the data comprises removing one or more outliers from the data.

6. The electronic device defined in claim 1, wherein the first subset of the one or more sensors comprises a gaze tracking system that is configured to measure eye vergence.

7. A non-transitory computer-readable storage medium storing one or more programs configured to be executed by one or more processors of an electronic device that comprises one or more sensors and one or more displays, the one or more programs including instructions for:

displaying, via the one or more displays, a virtual object at a first depth;

using a first subset of the one or more sensors, determining that an eye focus depth is different than the first depth;

while displaying the virtual object, shifting the virtual object from the first depth towards the eye focus depth;

in accordance with determining that a first criterion associated with a current depth of the virtual object relative to the eye focus depth is met, locking the virtual object at the current depth;

using a second subset of the one or more sensors, detecting a change in head position or head rotation; and unlocking the virtual object based on the change in head position or head rotation.

8. The non-transitory computer-readable storage medium defined in claim 7, wherein the instructions further comprise instructions for:

after locking the virtual object at the current depth and before unlocking the virtual object, continuing to display the virtual object at the current depth while the first subset of the one or more sensors indicates a change in the eye focus depth.

9. The non-transitory computer-readable storage medium defined in claim 8, wherein the instructions further comprise instructions for:

after unlocking the virtual object, shifting the virtual object from the current depth towards an updated eye focus depth indicated by the first subset of the one or more sensors.

10. The non-transitory computer-readable storage medium defined in claim 7, wherein displaying the virtual object at the first depth, determining that the eye focus depth is different than the first depth, shifting the virtual object from the first depth towards the eye focus depth, and locking the virtual object at the current depth comprises displaying the virtual object at the first depth, determining that the eye focus depth is different than the first depth, shifting the virtual object from the first depth towards the eye focus depth, and locking the virtual object at the current depth in accordance with a determination that the virtual object is a first type of virtual object that has a location defined relative to a location corresponding to the electronic device or a user of the electronic device.

11. The non-transitory computer-readable storage medium defined in claim 7, wherein the instructions further comprise instructions for:

receiving data from the first subset of the one or more sensors; and filtering the data to obtain filtered data, wherein determining that the eye focus depth is different than the first depth comprises determining that the eye focus depth is different than the first depth using the filtered data, wherein filtering the data comprises time-averaging the data, and wherein filtering the data comprises removing one or more outliers from the data.

12. The non-transitory computer-readable storage medium defined in claim 7, wherein the first subset of the one or more sensors comprises a gaze tracking system that is configured to measure eye vergence.

13. A method of operating an electronic device that comprises one or more sensors and one or more displays, the method comprising:

displaying, via the one or more displays, a virtual object at a first depth;

using a first subset of the one or more sensors, determining that an eye focus depth is different than the first depth;

while displaying the virtual object, shifting the virtual object from the first depth towards the eye focus depth;

in accordance with determining that a first criterion associated with a current depth of the virtual object relative to the eye focus depth is met, locking the virtual object at the current depth;

using a second subset of the one or more sensors, detecting a change in head position or head rotation; and unlocking the virtual object based on the change in head position or head rotation.

14. The method defined in claim 13, further comprising:

after locking the virtual object at the current depth and before unlocking the virtual object, continuing to display the virtual object at the current depth while the first subset of the one or more sensors indicates a change in the eye focus depth.

15. The method defined in claim 14, further comprising:

after unlocking the virtual object, shifting the virtual object from the current depth towards an updated eye focus depth indicated by the first subset of the one or more sensors.

16. The method defined in claim 13, wherein displaying the virtual object at the first depth, determining that the eye focus depth is different than the first depth, shifting the virtual object from the first depth towards the eye focus depth, and locking the virtual object at the current depth comprises displaying the virtual object at the first depth, determining that the eye focus depth is different than the first depth, shifting the virtual object from the first depth towards the eye focus depth, and locking the virtual object at the current depth in accordance with a determination that the virtual object is a first type of virtual object that has a location defined relative to a location corresponding to the electronic device or a user of the electronic device.

17. The method defined in claim 13, further comprising:

receiving data from the first subset of the one or more sensors; and filtering the data to obtain filtered data, wherein determining that the eye focus depth is different than the first depth comprises determining that the eye focus depth is different than the first depth using the filtered data, wherein filtering the data comprises time-averaging the data, and wherein filtering the data comprises removing one or more outliers from the data.

18. The method defined in claim 13, wherein the first subset of the one or more sensors comprises a gaze tracking system that is configured to measure eye vergence.

19. The electronic device defined in claim 1, wherein detecting the change in head position or head rotation comprises detecting a change in head position over a threshold and wherein unlocking the virtual object comprises unlocking the virtual object in response to the change in head position exceeding the threshold.

20. The electronic device defined in claim 1, wherein detecting the change in head position or head rotation comprises detecting a change in head rotation over a threshold and wherein unlocking the virtual object comprises unlocking the virtual object in response to the change in head rotation exceeding the threshold.

21. The electronic device defined in claim 6, wherein the second subset of the one or more sensors comprises a gyroscope or accelerometer.

* * * * *